United States Patent
Fenchel

[19]

[11] Patent Number: 6,018,780
[45] Date of Patent: Jan. 25, 2000

[54] METHOD AND APPARATUS FOR DOWNLOADING A FILE TO A REMOTE UNIT

[75] Inventor: Gary Grant Fenchel, Lisle, Ill.

[73] Assignee: Lucent Technologies Inc., Murray Hill, N.J.

[21] Appl. No.: 09/081,192

[22] Filed: May 19, 1998

[51] Int. Cl.$^7$ ............................. G06F 11/16; G06F 13/00; G06F 13/42

[52] U.S. Cl. .............................. 710/105; 710/11; 710/21; 709/230; 709/237; 712/28; 714/11

[58] Field of Search ................... 395/291, 200.7, 395/200.37, 200.47, 200.49, 287, 309; 714/4, 6, 7, 10, 11–13; 710/11, 21, 105, 129; 709/205, 217, 230, 238, 237; 712/28

[56] References Cited

U.S. PATENT DOCUMENTS

| | | | |
|---|---|---|---|
| 4,141,006 | 2/1979 | Braxton | 340/505 |
| 4,868,742 | 9/1989 | Gant et al. | 395/850 |
| 4,994,963 | 2/1991 | Rorden et al. | 395/309 |
| 5,237,567 | 8/1993 | Nay et al. | 370/438 |
| 5,301,340 | 4/1994 | Cook | 712/24 |
| 5,321,697 | 6/1994 | Fromm et al. | 364/DIG. 2 |
| 5,361,334 | 11/1994 | Cawley | 395/200.73 |
| 5,448,505 | 9/1995 | Novak | 702/170 |
| 5,469,549 | 11/1995 | Simpson et al. | 395/200.43 |
| 5,511,177 | 4/1996 | Kagimasa et al. | 711/114 |
| 5,579,239 | 11/1996 | Freeman et al. | 348/14 |
| 5,625,815 | 4/1997 | Maier et al. | 707/8 |
| 5,630,056 | 5/1997 | Horvath et al. | 714/56 |
| 5,684,716 | 11/1997 | Freeman | 345/328 |
| 5,712,976 | 1/1998 | Falcon, Jr. et al. | 709/219 |
| 5,734,817 | 3/1998 | Roffe et al. | 707/202 |
| 5,778,206 | 7/1998 | Pain et al. | 710/129 |
| 5,841,963 | 11/1998 | Nakamikawa et al. | 714/11 |
| 5,884,143 | 3/1999 | Wolkstein et al. | 455/13.4 |

*Primary Examiner*—Xuan M. Thai
*Attorney, Agent, or Firm*—Jack R. Penrod

[57] ABSTRACT

A method and apparatus that takes advantage of the connectivity of a unit to speed up communication of needed files to the unit. The method uses each port as a channel to input or pump a portion of the file. If a unit has N equally fast ports, it could possibly pump a file in N portions and take 1/N amount of pumping time. This saves the time of craft personnel performing the load without any degradation of the file. Once all portions are received, the unit has sufficient processing capability to rejoin the portions back into the needed file. The method also allows for the possibility that a port or channel will not be operating properly and automatically sends the portions through the remaining available channel(s) and port(s).

9 Claims, 3 Drawing Sheets

METHOD AND APPARATUS FOR DOWNLOADING A FILE TO A REMOTE UNIT

TECHNICAL FIELD

The invention relates to data communication and more particularly to downloading of files to a computer.

DESCRIPTION OF THE PRIOR ART

A known data communication system has multiple computers connected to multiple peripheral data buses for communicating data to multiple ports on a single peripheral unit in order to provide higher reliability of data communication by redundant data paths. In systems having redundant buses, one bus at a time is used to communicate with the peripheral unit while the other bus or buses are not used. Only when the one bus is not selected as the primary bus or is not available is one of the other buses used for communicating data into the peripheral unit. This is the redundancy advantage. However, if the peripheral has two or more ports, only one is being used, leaving at least one port and at least one data bus unused. This is a major waste of data communication bandwidth, the result of which is a longer total time to transfer data, such as a file or group of files, to a peripheral.

It is an object of this invention to provide a method for faster downloading of files to a computer peripheral.

It is another object of the present invention to provide a method making a system robust against file corruption.

It is an object of the present invention to provide a method for using multiple data buses to download a file or group of files to a peripheral connected via two or more ports to the two data buses with each data bus communicating approximately half of the data.

It is a further object of the present invention to provide a method for redundant data communication by having an error on one bus induce the other data bus or buses to send approximately equal portions of the data.

SUMMARY OF THE INVENTION

Briefly stated in accordance with one aspect of the invention, the foregoing objects are achieved by providing a method for transferring a file to a remote unit that has multiple communication ports, and includes the steps of: dividing the file into multiple portions equal in number to the multiple communication port with each portion being substantially similar in amount of data contained therein; starting a communication of a first portion of the plurality of portions from a first computer to a first port of the remote unit; communicating a message from the first computer to a second computer requesting the second computer communicate a second portion of the plurality of portions to a second port of the remote unit; starting a communication of a second portion of the multiple portions from the second to a second port of the remote unit while the first computer is communicating the first portion to the remote unit; completing communication of the first portion to the remote unit, and completing communication of the second portion to the remote unit. In accordance with another aspect of the invention the foregoing object are achieved by providing a system for communicating a file to a unit that has a first and second communication ports, the system including: a first computer attached to the first communication port of the unit; the first computer having the file divided into a first and a second portions that are substantial equal in size; a second computer attached to the second port of the unit; the second computer having the file divided into a third and a fourth portions that are substantially equal in size. The first portion is equivalent to the third portion and the second portion is equivalent to the fourth portion. After the first computer has started to communicate the first portion of the file to a first communication port of the unit, the first computer sends a request to the second computer for the second computer to communicate the fourth portion of the file to the second communication port, and after the second computer receives the request, if there are no errors at the second computer, the second computer communicates the fourth portion of the file to the second communication port of the unit partly overlapping the communication of the first portion by the first computer to the first communication port of the unit. After the unit receives all necessary portions, each computer that communicated a portion sends a jump instruction which when all computers communicating portions have sent such instructions, the unit starts a process that converts the portions back into the file for use by the unit.

DETAILED DESCRIPTION

Figure 1:
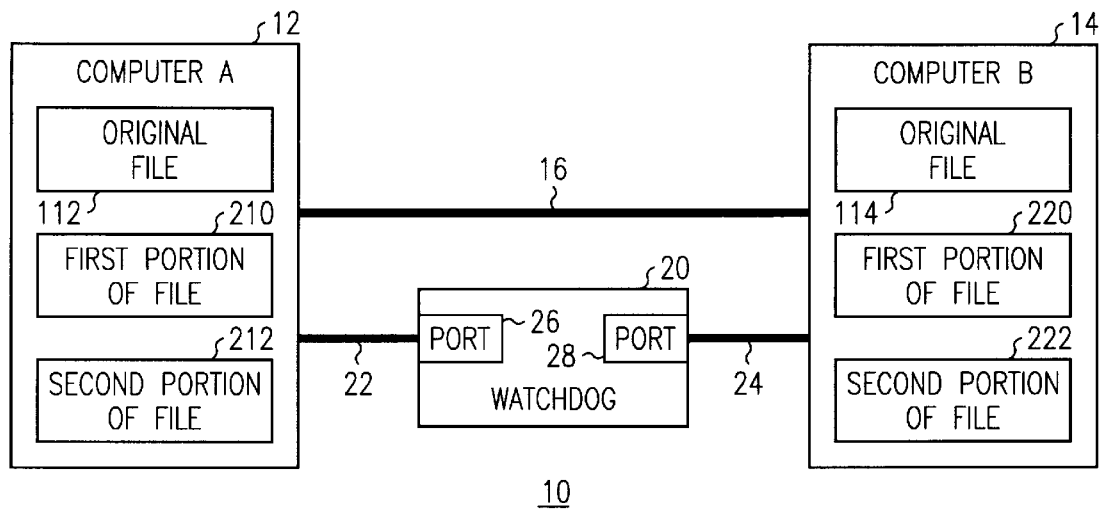
FIG. 1 is a block diagram of a system for practicing the invention.

An example of a system 10 for practicing the present invention is shown in FIG. 1. System 10 has computer 12 and computer 14 connected to peripheral unit 20 by data buses 22 and 24 respectively, and to each other by data bus 16. Data buses 22 and 24 connect to the peripheral unit 20 at port 26 and port 28 respectively. In this exemplary embodiment, the peripheral unit 20 is a Reliable Clustered Computer (RCC) watchdog system, but it could be any one of a number of other units or peripherals, such as switching modules. Really, any unit to which digital data may be pumped.

Computer 12 and computer 14 work together to download a file or a group of files. For example, assume that a file named "task" is to be downloaded, also sometimes referred to as "pumped". Further assume peripheral unit 20 to be pumped is attached to computers 12 and 14 which can communicate with each other via data bus 16. Each of the computers 12 and 14 has a copy of the "task" file. Each of the computers 12, 14 follows the same process to split the "task" file is split into two files, named "task.1" and "task.2". Thus, both of these files, "task.1" and "task.2", have copies in computer 12 and computer 14. Now if computer 12 receives or generates a command to begin pumping peripheral unit 20, it immediately begins downloading file "task.1" and sends a command to computer 14 to download file "task.2". It should be noted that it could just as easily have been computer 14 that received or generated a command to start pumping peripheral unit 20 and immediately begin pumping file "task.1" and signaling to computer 12 to begin pumping file "task.2" instead. If no response is received by computer 12 from computer 14 to the request then computer 12 repeats the command to download "task.2". In this instance, computer 12 ends up pumping both "task.1" and "task.2". If computer 14 informs computer 12 that it can not download "task.2" then computer 12 downloads "task.2", just as if computer 14 had not responded to the request of computer 12. If computer 14 sends a message to computer 12 that it will download "task.2" but computer 12 does not receive the message, then "task.2" will be downloaded by both computer 12 and computer 14. However, since the downloading is addressed, the result is that the second computer to download "task.2" will replace the previous image of "task.2" with an identical image (assuming the first image was error free).

For small transfers, one of the computers could send either the whole file to the other computer or the file could be originally loaded into each of the computers 12, 14. The third possibility of having one computer do the file splitting and then downloading the other computer has more potential single point failures, so it is less robust and less reliable statistically. For distributions to a large number of peripherals, original loading from disk or tape is more advantageous from a bandwidth perspective. However, if some of the computers doing the pumping are difficult to physically load by service personnel, loading from on computer to another over bus 16, with appropriate error detection and correction methods, is more advantageous from a travel and personnel cost perspective.

Figure 2:
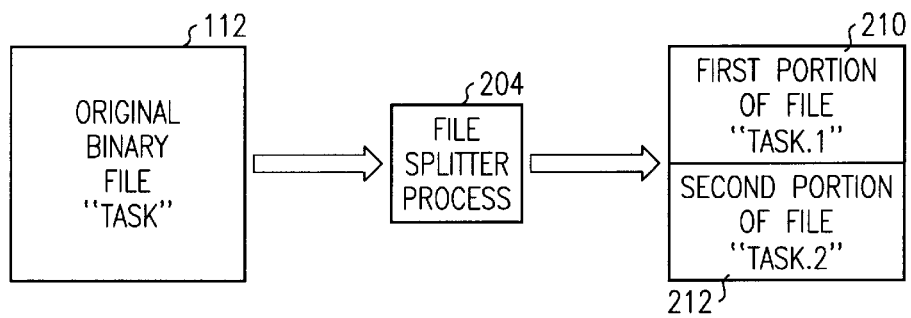
FIG. 2 illustrates processing of data files for communication over multiple buses, yet having a redundant file communication capability.

Referring now to FIGS. 1 and 2, preferably each computer 12, 14 has a respective copy of the whole original file "task" 112, 114. Each computer 12, 14 processes its copy of the original file 112, 114 into two approximate halves. For brevity, only the processing of "task" copy 112 by computer 12 is described. Those in the art will recognize that a virtually identical process generates equivalent, virtually identical, results within computer 14. As shown in FIG. 2, "task" copy 112 is processed by file splitter process 204 into two approximate halves "task.1" copy 210 and "task.2" copy 212. In a similar manner (not shown), computer 14 processes "task" copy 114 into two approximate halves "task.1" copy 220 and "task.2" copy 222.

The file splitter process 204 determines the size of the file "task" 112 and splits it into two portions 210 and 212 that are approximately halves. Each of the portions 210 and 212 is processed into a format, such as Intel X86 hexadecimal, suitable for pumping to the peripheral unit 20. Intel is a registered trademark of Intel Corporation, Santa Clara, Calif. A header is added to each of the portions 210,212. Each header includes information regarding timestamps, file size, and a file sum for the entire reconstructed image.

Figure 3:
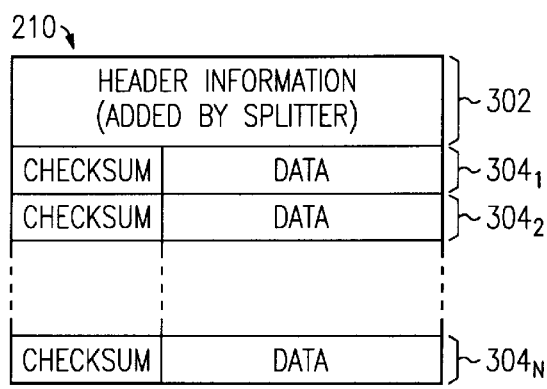
FIG. 3 illustrates a data formatting used in one embodiment of the invention.

Referring now to FIG. 3, the format of the portion 210 is shown as a representative processed file. Portion 210 has header 302 which has time created and file size information. The header 302 is followed by N lines 3041–304N which carry the data. A length of each line is determined by the splitter process, which also appends a checksum to each line. Portions 212, 220 and 222 are similarly processed.

Figure 4A:
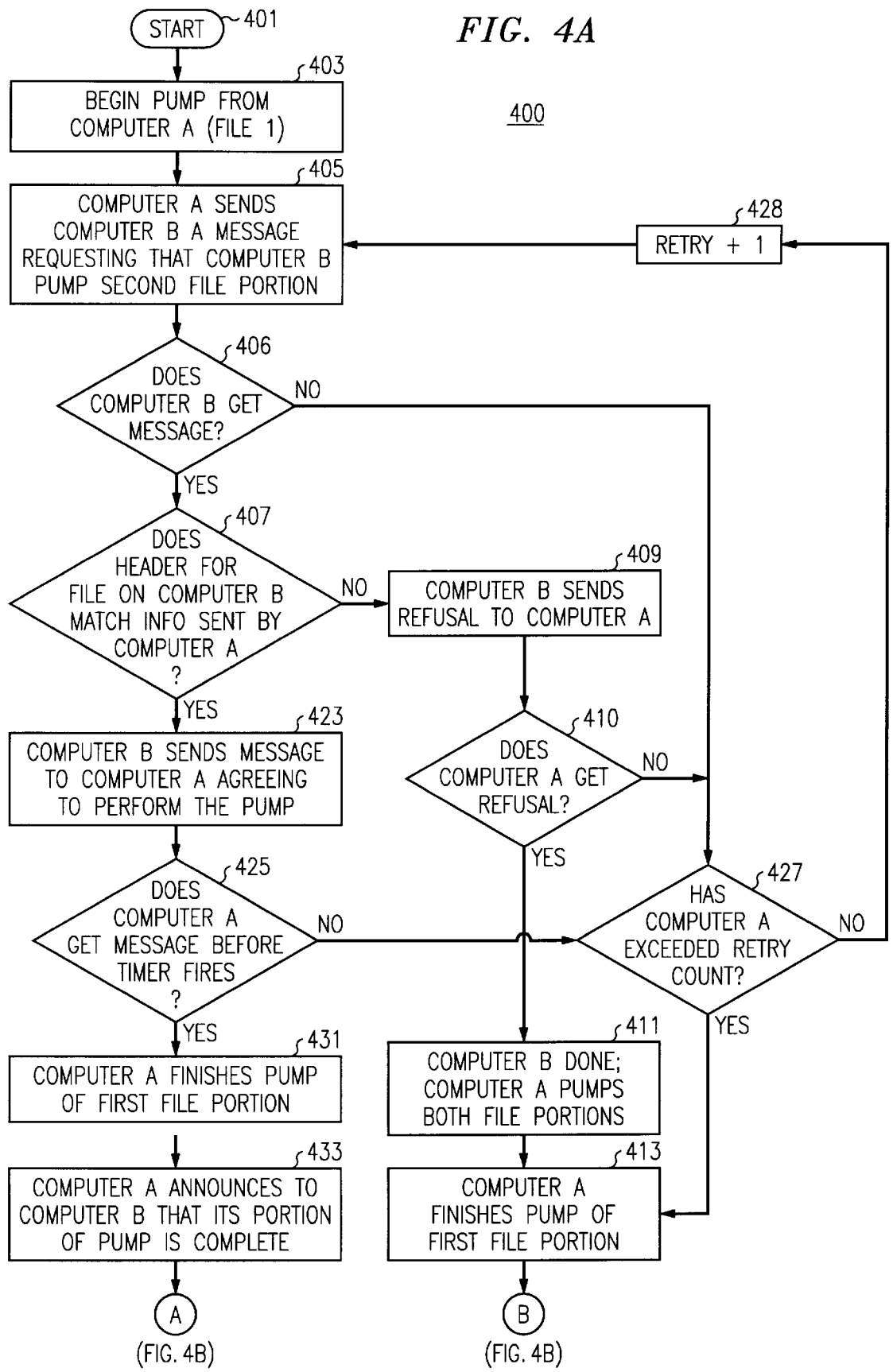
FIG. 4A and FIG. 4B together form a flow diagram showing the actions that can be taken to provide a method for downloading for a file or group of files to a peripheral.
Figure 4B:
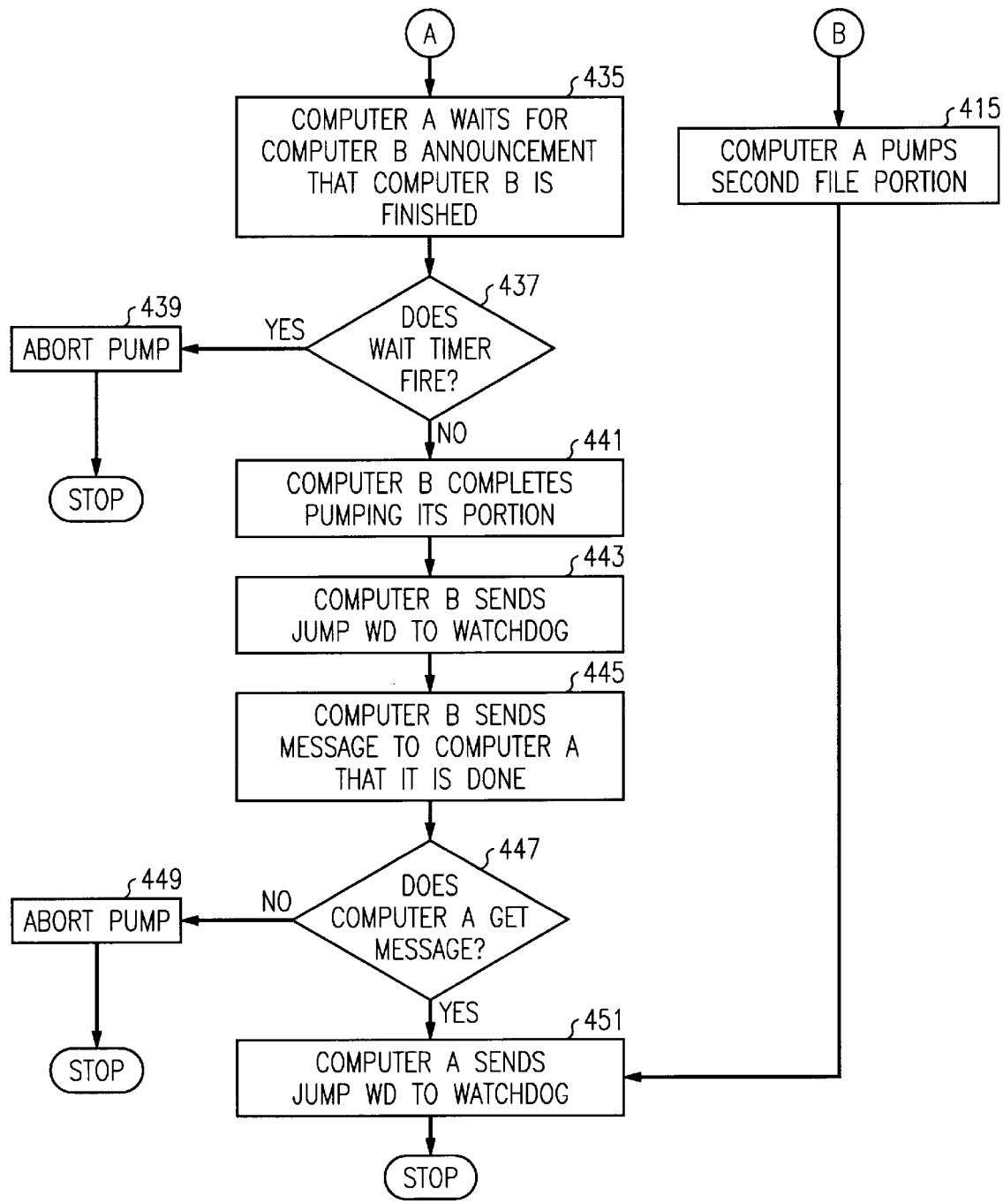

Referring now to FIGS. 4A and 4B, a method 400 for pumping a file to a peripheral. Method 400 begins with action 401 which is the start and progresses to action 403. Action 403 induces computer_A to start the method 400 by pumping the first portion (file 1) of the overall file. Next, method 400 progresses to action 405. Action 405 has computer_A send a message to computer_B requesting that computer_B pump the second portion of the file to the peripheral. After action 405, method 400 progresses to decision 406. Decision 406 determines if computer_B got the message sent by computer_A. If computer_B does not get the message method 400 progresses to decision 427 and if computer_B does get the message from computer_A the method 400 progresses to decision 407. Decision 407 determines if the file on computer_B matches the header information sent by computer_A in its pump request message. If the decision is that the file does not match the header information, the method 400 progresses to action 409, otherwise if there is a match the method 400 progresses to action 423. Action 409 has computer_B send a refusal to pump the requested file to computer_A. After the refusal is sent, the method 400 progresses to decision 410 where a determination is made if computer_A got the refusal of computer_B. If computer_A got the refusal, method 400 progresses to action 411, and if computer_A did not get the refusal, method 400 progresses to decision 427. Action 411 is where computer_B declares that it has finished its duty and the method 400 then progresses to action 413.

The alternative path from decision 407 next progresses to action 423 where computer_B sends a message agreeing to pump as requested. After action 423, method 400 progresses to decision 425. Decision 425 determines if computer_A receives the message of computer_B agreeing to pump a portion of the file before a preset time period has run. If the determination is no, then method 400 progresses to determination 427. Decision 427 checks a retry count to see if it has been met. If the retry count has not been met, method 400 progresses to action 428 which iterates the retry count and returns to action 405. If the retry count has been met, then method 400 progresses to action 413 with the conclusion that computer_B cannot be counted upon to help pump the file. If at decision 425 the determination is yes, which is the desired result that computer_A and computer_B will cooperate in pumping the file to ports of the remote unit 20, then method 400 progresses to action 431.

Action 431 is where computer_A pumping of the first portion of the file to be communicated. Next is action 433, which is where computer_A announces to computer_B that its first portion of the file has been pumped to the remote unit 20. After action 433, action 435 is where computer_A waits for an announcement that computer_B has finished pumping its second portion of the file to the remote unit 20. Next, method 400 progresses to decision 437 where a determination is made if a preset wait time period has been exceeded. The exception is if the timer expires because of communication or operation problems between computer_B and computer_A. For an exception of this type to occur at this stage is unlikely and very difficult to deal with, so for such, method 400 progresses to action 439 which aborts the pumping of the file and then stops. After the stop, a repair and restart at action 401 is in order.

The normal determination at decision 437 is that the time period does not expire and method 400 progresses to action 441. At action 441, computersB completes the communication of the second portion to remote unit 20. Next, at action 443 computer_B sends a jump WD instruction to remote unit 20, which is a WatchDog unit, but could be some other type of remote unit. After action 443, at action 445 computer_B sends a message to computer_A that it has completed its task and it is done. Next, decision 447 determines if computer_A gets the "computer_B is done" message. For the negative exceptions, method 400 progresses to action 449, which aborts the file communication, and stops for repair or retry. For the usual positive determination that computer_A gets the "computer_B done" message, method 400 progresses to action 451. Action 451 is the normal last action of computer_A sending a jump WD to WatchDog remote unit 20 and then progressing to the stop, which means the method 400 has finished the communication of the file.

An alternative branch to action 451 is from either action 411 or decision 427 negative determination through action 413 and action 415. At action 413 computer_A finishes pumping the first portion of the file and method 400 progresses to action 415. At action 415, computer_B has not been completely responsive so computer_A pumps the second portion of the file. After action 415, method 400 progresses to action 451 where computer_A sends the remote unit 20 a jump instruction, then stops.

Remote unit 20, which in the exemplary embodiment is a watch dog unit, is given a jump instruction either by computer_A and by computer_B if both pump portions of the file. If because of problems only one of computer_A and computer_B pumps all portions, then only the pumping computer gives the jump instruction. Upon receiving the jump instruction, a processor in the remote unit 20 starts a process that joins the two portion back into the file desired to be communicated or pumped. Under typical operating conditions the pumping through multiple ports and rejoining is faster than pumping through a single port. When the file has to be pumped to multiple remote units, the time savings increase because the time required for the dividing of the file is spread over multiple pumps. If there are multiple computers pumping through multiple ports, then the remote unit being pumped must receive an end-of-file-portion instruction from each pumping computer before all the portions are joined together into the desired file.

Thus, it will now be understood that there has been disclosed a method and apparatus for pumping a file to a remote unit via multiple portions pumped through multiple ports of the remote unit. While the invention has been particularly illustrated and described with reference to preferred embodiments thereof, it will be understood by those skilled in the art that various changes in form, details, and applications may be made therein. For example, the file could be divided into multiple portions in real time, such as live video and/or audio and joined back together in real time at the remote unit upon receiving periodic portion completed signals. It is accordingly intended that the appended claims shall cover all such changes in form, details and applications which do not depart from the true spirit and scope of the invention.

What is claimed is:

1. A method for transferring a file to a remote unit using plurality of computers, said remote unit having a plurality of communication ports equal in number to the number of said plurality of computers, comprising the steps of:
   a. dividing said file into a plurality of portions equal in number to the number of said plurality of communication ports and to the number of said plurality of computers with each portion being equal in amount of data;
   b. starting a communication of a first portion of said plurality of portions from a first computer to a first port of said remote unit;
   c. communicating a message from said first computer to each other computer of said plurality of computers requesting each other computer of said plurality of computers to communicate its respective portion of said plurality of portions to a respective port of said remote unit;
   d. starting a communication of each other portion of said plurality of portions from each other computer of said plurality of computers to each other computer's respective port of said remote unit while said first computer is communicating said first portion to said remote unit;
   e. completing communication of said first portion to said remote unit;
   f. completing communication of said other portions to said remote unit; and
   wherein if the other computer does not complete communication of the other portion to said remote unit and advise said first computer of that completion within a predetermined time, said first computer communicates the other portion of the file stored in the first computer to said first port of said remote unit.

2. The method of claim 1, wherein a number of said plurality of communication ports of said remote unit is two.

3. The method of claim 2, wherein if said first computer does not complete communication of said first portion to said remote unit within a predetermined time and advise said other computer of that completion, said other computer communicates the first portion of said file stored within said other computer to said second port of said remote unit after said other computer completes communicating the other portion of said file to said remote unit.

4. The method of claim 1, wherein said file is divided into said plurality of portions by said first computer and all portions are transferred to each of said plurality of computers.

5. The method of claim 1, wherein said file exists in each computer and each computer uses a similar procedure to divide said file into said plurality of portions.

6. The method of claim 1, wherein said dividing step further comprises the steps of:
   generating a respective header for each of said plurality of portions, with each header indicating characteristics of that header's respective portion of said plurality of portions; and
   attaching each header to that header's respective portion of said plurality of portions.

7. The method of claim 1, further comprising the step of:
   processing said plurality of portions to recover said file by said remote unit.

8. A system for communicating a file to a unit, said unit having a first and second communication ports, comprising:
   a first computer attached to said first communication port of said unit;
   said first computer having said file divided into a first and a second equal portions;
   a second computer attached to said second port of said unit; said second computer having said file divided into a third and a fourth equal portions;
   said first portion is equivalent to said third portion and said second portion is equivalent to said fourth portion;
   after said first computer has started to communicate said first portion of the file to said first communication port of said unit, said first computer sends a request to said second computer for said second computer to communicate said fourth portion of the file to said second communication port;
   after said second computer receives said request, if there are no faults hindering operation of said second computer, said second computer acknowledges receipt of said request to said first computer and communicates said fourth portion of said file to said second communication port of said unit partly overlapping the communication of said first portion by said first computer to said first communication port of said unit;

after said first portion of said file has been communicated by said first computer and a specific delay time has expires and said first computer have not receive a fourth portion completed signal from said second computer, said first computer communicates said second portion of said file to said first communication port of said unit; and after said second portion is communicated, said first computer communicates a jump command to said unit which activates a program within said unit that puts the first and second portions back together to form said file for use in said unit.

9. The system of claim 8, further comprising:

after said second computer has communicated said fourth portion, if a complete first portion was not communicated by said first computer after a specific time, said second computer communicates said third portion of said file to said second port of said unit; and after said third portion is communicated, said second computer communicates a jump command to said unit which activates a program within said unit that puts the third and fourth portions back together to form said file for use in said unit.

* * * * *